United States Patent
Matthews, Jr.

(10) Patent No.: US 7,552,727 B2
(45) Date of Patent: Jun. 30, 2009

(54) STATIONARY, SOLAR-POWERED BOILER FOR GENERATING STEAM

(76) Inventor: Floyd E. Matthews, Jr., 17928 Old Jefferson Hwy., Prairieville, LA (US) 70769

( * ) Notice: Subject to any disclaimer, the term of this patent is extended or adjusted under 35 U.S.C. 154(b) by 172 days.

(21) Appl. No.: 11/848,839

(22) Filed: Aug. 31, 2007

(65) Prior Publication Data
US 2009/0056646 A1 Mar. 5, 2009

(51) Int. Cl.
*F24J 3/02* (2006.01)
*F02C 3/30* (2006.01)

(52) U.S. Cl. .................. 126/680; 126/688; 126/438; 122/209.1; 122/13.1; 122/407; 122/441; 122/442; 60/39.3; 60/39.55; 60/39.07

(58) Field of Classification Search ............... 126/680, 126/438, 681, 690; 122/209.1, 13.1; 60/39.3, 60/39.55, 39.07
See application file for complete search history.

(56) References Cited

U.S. PATENT DOCUMENTS

| | | |
|---|---|---|
| 3,868,823 A | 3/1975 | Russell, Jr. et al. |
| 3,905,352 A | 9/1975 | Jahn |
| 3,934,573 A | 1/1976 | Dandini |
| 3,999,389 A | 12/1976 | Bryce |
| 4,047,517 A | 9/1977 | Arnberg |
| 4,079,591 A | 3/1978 | Derby et al. |
| 4,091,622 A | 5/1978 | Marchesi |
| 4,153,039 A | 5/1979 | Carroll |
| 4,154,219 A | 5/1979 | Gupta et al. |
| 4,159,629 A | 7/1979 | Korr et al. |
| 4,171,695 A | 10/1979 | Sletten |
| 4,213,303 A | 7/1980 | Lane |
| 4,232,523 A | 11/1980 | Derby et al. |
| 4,249,083 A | 2/1981 | Bitterly |
| 4,265,223 A | 5/1981 | Miserlis et al. |
| 4,276,872 A | 7/1981 | Blake et al. |
| 4,283,887 A | 8/1981 | Horton et al. |

(Continued)

FOREIGN PATENT DOCUMENTS

| DE | 2802859 A1 | 7/1979 |
|---|---|---|
| FR | 2450363 | 2/1979 |

OTHER PUBLICATIONS

STIC, EIC 3700 search report.*

*Primary Examiner*—Steven B McAllister
*Assistant Examiner*—Nikhil Mashruwala
(74) *Attorney, Agent, or Firm*—McGlinchey Stafford, PLLC

(57) ABSTRACT

A boiler for generating steam has a substantially enclosed housing configured to contain an amount of water to be boiled, the housing having one or more thermally conductive sidewalls which form a substantially enclosed water chamber and a reflection chamber, the reflection chamber including a closed top portion and a opening through which light rays may pass, the opening being vertically disposed below the top portion of the chamber so that the reflection chamber may trap heat, wherein at least one of the thermally conductive sidewalls is disposed so as to divide the water chamber from the reflection chamber. The boiler also include a support structure attached to or integral with the housing, which support structure supports the housing in a substantially fixed position during use of the boiler, and reflecting means for reflecting sunlight through the opening of the reflection chamber and onto a focal point on one or more inner surfaces of the top portion of the reflection chamber. Methods of generating steam and electricity are also described.

9 Claims, 5 Drawing Sheets

U.S. PATENT DOCUMENTS

| | | |
|---|---|---|
| 4,286,581 A | 9/1981 | Atkinson, Jr. |
| 4,314,545 A | 2/1982 | Bowman |
| 4,365,618 A | 12/1982 | Jones |
| 4,452,232 A * | 6/1984 | David .................. 126/587 |
| 4,476,853 A | 10/1984 | Arbogast |
| 4,490,981 A | 1/1985 | Meckler |
| 4,491,125 A | 1/1985 | Sainsbury |
| 4,581,897 A | 4/1986 | Sankrithi |
| 4,676,068 A | 6/1987 | Funk |
| 4,823,772 A | 4/1989 | Lenz |
| 4,832,002 A | 5/1989 | Medina |
| 4,934,324 A | 6/1990 | Lenz |
| 4,977,744 A | 12/1990 | Lenz |
| 5,016,998 A | 5/1991 | Butler et al. |
| 5,047,654 A | 9/1991 | Newman |
| 5,203,318 A | 4/1993 | Chauvet |
| 5,347,986 A | 9/1994 | Cordy |
| 5,421,322 A * | 6/1995 | Karni et al. .................. 126/680 |
| 5,775,107 A | 7/1998 | Sparkman |
| 5,983,634 A | 11/1999 | Drucker |
| 6,279,312 B1 * | 8/2001 | Hennecke .................. 60/39.3 |
| 6,886,339 B2 | 5/2005 | Carroll et al. |
| 6,926,440 B2 | 8/2005 | Litwin |
| 6,931,851 B2 | 8/2005 | Litwin |
| 2004/0112374 A1 | 6/2004 | Litwin |
| 2004/0244376 A1 | 12/2004 | Litwin et al. |
| 2005/0126170 A1 | 6/2005 | Litwin |
| 2006/0225729 A1 | 10/2006 | Litwin |

* cited by examiner

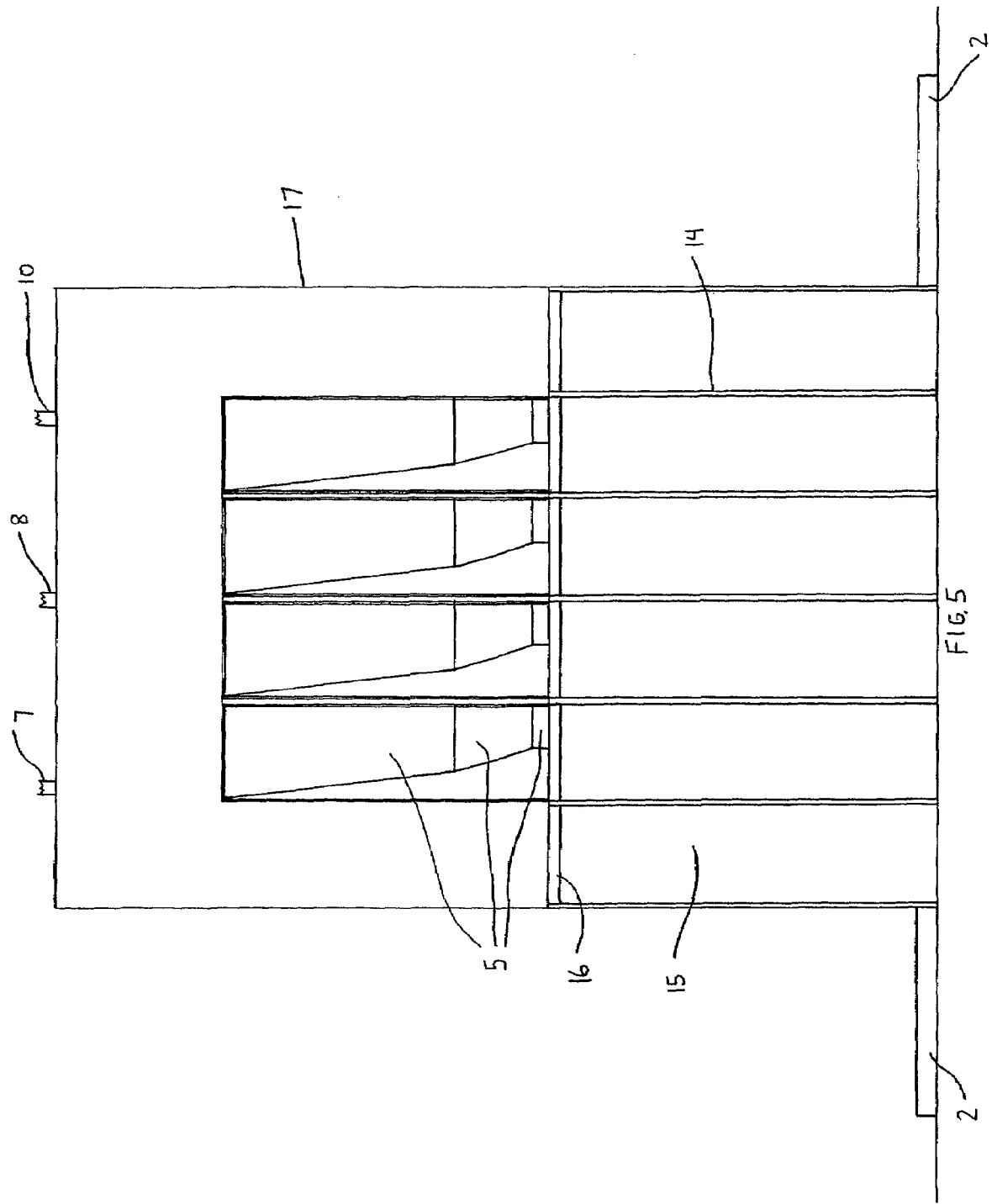

STATIONARY, SOLAR-POWERED BOILER FOR GENERATING STEAM

TECHNICAL FIELD

This invention relates to apparatus employing solar energy to power steam boilers, including steam boilers useful in generation of electricity.

SUMMARY OF THE INVENTION

This invention provides, in one embodiment, a novel and surprisingly effective solar-powered steam boiler which harnesses the power of solar energy in a unique and highly efficient way to generate steam, which can then be used for various purposes, including for example the generation of electricity. Thus, one embodiment of the invention is a boiler for generating steam, the boiler comprising a substantially enclosed housing configured to contain an amount of water to be boiled, the housing comprising one or more thermally conductive sidewalls which form a substantially enclosed water chamber and a reflection chamber, the reflection chamber including a closed top portion and a opening through which light rays may pass, the opening being vertically disposed below the top portion of the chamber so that the reflection chamber may trap heat, wherein at least one of the thermally conductive sidewalls is disposed so as to divide the water chamber from the reflection chamber; a support structure attached to or integral with the housing, which support structure supports the housing in a substantially fixed position during use of the boiler; and reflecting means for reflecting sunlight through the opening of the reflection chamber and onto a focal point on one or more inner surfaces of the top portion of the reflection chamber.

In another embodiment of the invention, the boiler further comprising a feed conduit sized and configured for controlled feeding of steam under pressure through at least one of the sidewalls and into the top portion of the reflection chamber. In a particular embodiment of the invention, the steam is superheated steam formed within the water chamber during boiler operation. The boiler may further comprise a control valve which terminates the steam feed through the feed conduit when sunlight is not being reflected into the reflection chamber.

In some boiler embodiments of the present invention, the reflecting means comprises a tracking heliostat. In still other embodiments, one or more of the thermally conductive sidewalls of the housing further define, at least in part, a release chamber through which heated gas and/or steam from the reflection chamber may flow before being released into the atmosphere, at least one of the thermally conductive sidewalls of the housing which defines the release chamber placing the release chamber in thermal communication with the water chamber so that at least a portion of the heat in the release chamber generated during boiler operation is absorbed by water when water is present in the water chamber. In another aspect of the invention, the opening of the reflection chamber may be sized and configured so that reflected sunrays from the reflecting means pass through the opening and are incident upon the focal point during daylight hours.

Another embodiment of the present invention is a method of generating steam. This method comprises providing water to a water chamber formed by a substantially stationary boiler housing; reflecting sunlight onto a focal point in a top portion of a reflection chamber, the reflection chamber being defined by at least a portion of the boiler housing and being in thermal communication with the water chamber, the reflection chamber defining the top portion and a bottom opening vertically disposed below the top portion so as to at least partially trap heat in the reflection chamber when sunlight is reflected onto the focal point to thereby transfer heat into the water chamber to generate steam therein; injecting a portion of the steam formed in the water chamber into the top portion of the reflection chamber while sunlight is reflected onto the focal point; and controllably releasing steam from the water chamber.

Still another embodiment of the invention is a method of generating electricity, the method comprising carrying out the method of generating steam as summarized above, and feeding the steam controllably released from the water chamber into a steam turbine to thereby generate electricity.

These and other embodiments and features of this invention will be still further apparent from the ensuing description, figures and appended claims.

BRIEF DESCRIPTION OF THE DRAWINGS

FIG. 5 illustrates a rear perspective view of the embodiment of FIG. 1.

Like numbers or reference indicators are used to refer to like parts or components illustrated amongst the several figures.

FURTHER DETAILED DESCRIPTION OF THE INVENTION

Figure 1:
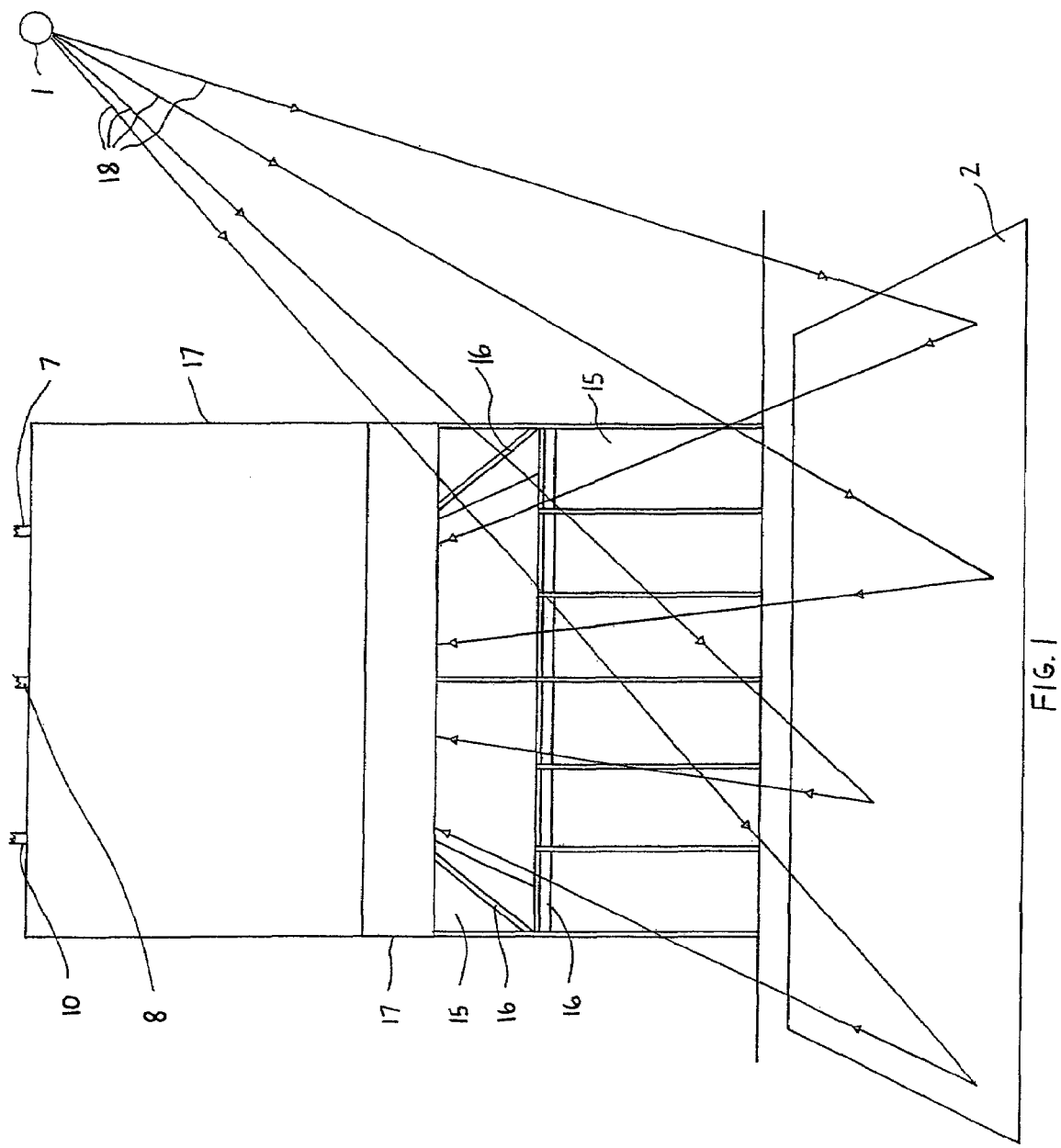
FIG. 1 illustrates a frontal perspective view of one embodiment of the subject invention.

As will now be appreciated, the present invention enables a relatively small footprint heliostat (as compared to previously known systems) or similar reflecting means to provide concentrated sunlight to a heat trap in the form of the reflecting chamber of this invention, which is employed to heat water in a surrounding water chamber formed by the boiler housing. By maintaining the reflecting chamber in a fixed position during daylight hours, the heat trap in effect is maintained regardless of the angular position of the reflecting means or the light rays reflected thereby. In a particular embodiment of the invention, steam generated in the water chamber is injected into the reflecting chamber in order to disburse the heat generated at the focal point of the concentrated sunlight, thereby increasing the heated volume which in turn increased the heated surface area of the boiler housing. In this way, large volumes of water can be brought to boiling point more efficiently. By trapping the heat more effectively, the system becomes more economically efficient through a reduction in the scale of the reflecting means required to produce a given amount of heat and steam.

The boiler housing of this invention will be made of any material capable of supporting the housing contents while withstanding the heat and pressure which will be incident upon it. Typically, it will be comprised of steel or similar material which is lined, where appropriate, with heat disbursing material such as, e.g., firebrick or the like. The sidewalls of the housing will be thermally conductive so that heat generated in the reflection chamber and flowing through the release chamber may be effectively transferred at least in part through the sidewalls surrounding water in the water chamber.

The reflecting means of the invention may include mirror-based reflecting devices or apparatus such as, for example, heliostats, tracking heliostats, or the like. They are preferably tracking heliostats.

The reflection chamber of this invention should be sized and shaped to form a sufficiently large opening to permit all or substantially all of the light reflected by the reflecting means to pass into the reflecting chamber to the focal point. The focal point in the reflection chamber is an area on the inner surface of the sidewall(s) of the top portion of the reflecting chamber. The area will typically be far smaller than the dimension of the opening of the reflecting chamber and will be the area which receives the greatest amount of lightwave-generated heat. The sidewall(s) at the focal point will thus typically be protected by a layer of heat-dissipating material, e.g., firebrick. As used herein, the term "substantially fixed position" when used with reference to the housing and how it is supported, means that the housing is supported in such a way that, during normal operation of the boiler, the reflecting chamber does not move to an extent which would cause additional heat loss from the reflection chamber volume.

The water chamber of this invention is sized and configured to contain water for boiling, and typically will be equipped with a water feed conduit and control valve, a pressure relief conduit and control valve, and a steam relief conduit and control valve, and a dump valve for removal of liquids from the water chamber during downtime servicing. Conventional control systems may be present to enable the facile control of the conduits and their associated valves during operation and servicing.

Figure 2:
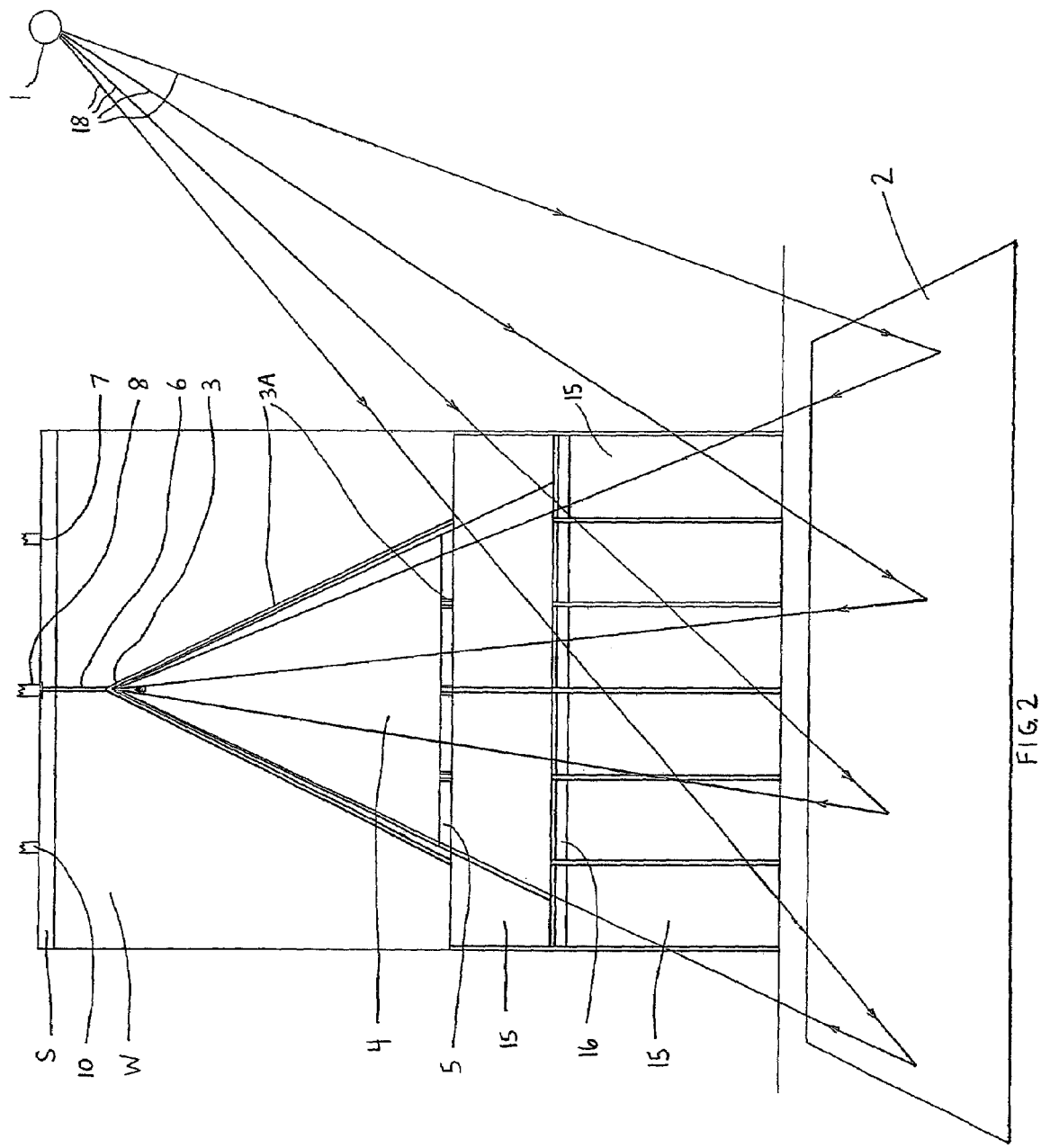
FIG. 2 illustrates a frontal cross-sectional view of the embodiment of FIG. 1.
Figure 3:
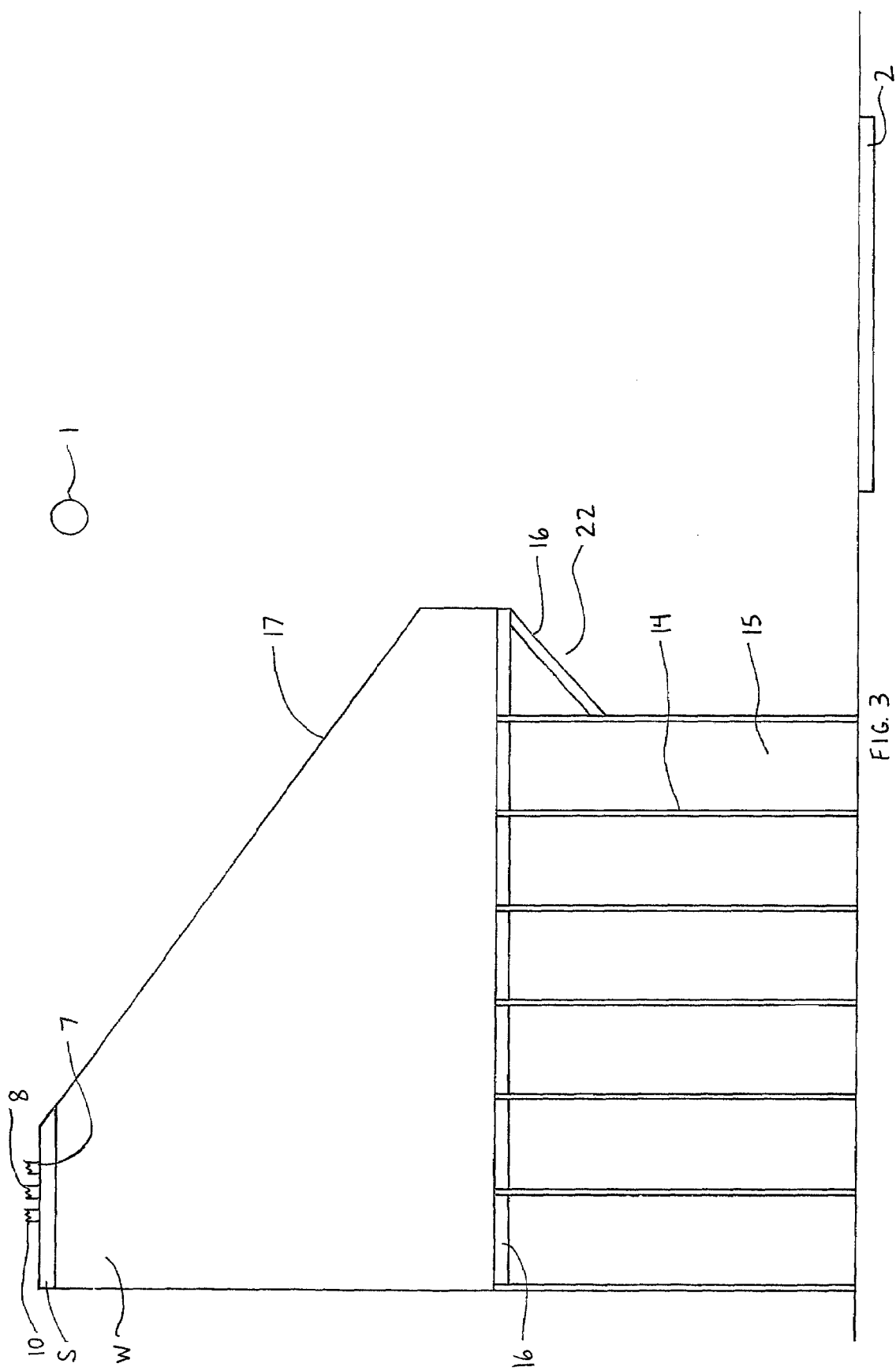
FIG. 3 illustrates a side perspective view of the embodiment of FIG. 1.
Figure 4:
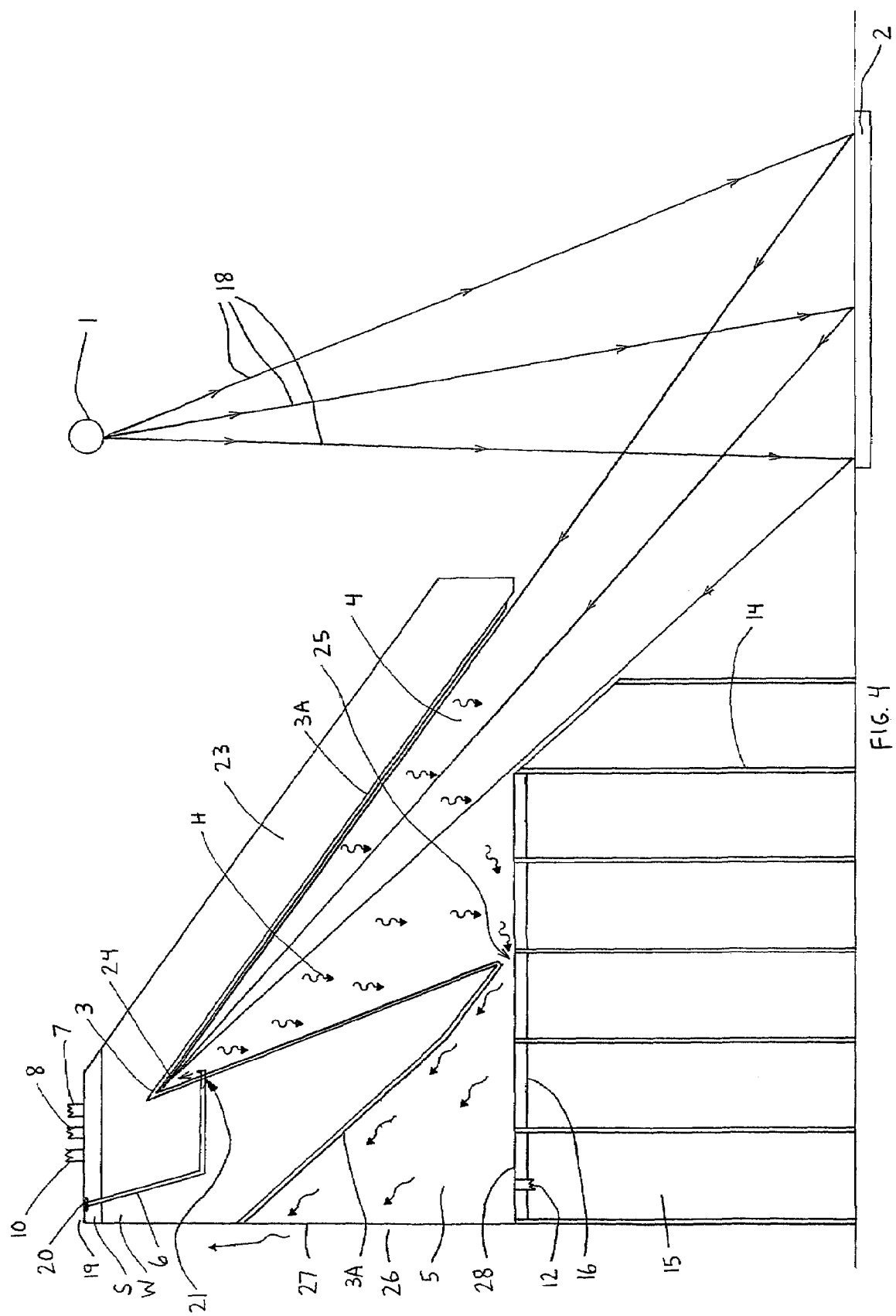
FIG. 4 illustrates a side cross-sectional view of the embodiment of FIG. 1.

Turning now to the figures, FIGS. 1-5 illustrate one embodiment of the present invention, in the form of a solar-powered steam generator system. The illustrated system comprises reflecting means in the form of a tracking heliostat mirror matrix 2 and a stationary water housing 17 supported by a plurality of stationary concrete panels 15. Heliostat 2 dynamically directs a plurality of solar light rays 18 produced by the sun 1 into an opening 22 defined by steel side beams 16 of housing 17. Sidewalls 3A further define a reflecting chamber in the form of a oblique pyramidal chamber 4, a top portion 3 which includes the focal point (insulated by firebrick not shown) at which solar rays reflected by heliostat matrix 2 are concentrated.

Housing 17 also forms a water boiling chamber 23 equipped for controlled, fluid communication with a water feed line 7, a steam relief line 8 and an emergency relief valve line 10. A steam pipe 6 is operatively connected to top portion 3 of the pyramidal chamber at a first end portion 19 and is operatively connected to a regulator 20 at a second end portion 21. Regulator 20 controls the amount of steam S allowed to flow in steam pipe 6.

As solar light rays 18 are produced by sun 1, heliostat mirror matrix 2 is positioned in such a manner as to direct reflecting solar rays 18 off of heliostat mirror 2 matrix to a focal point 24 at top portion 3 of oblique pyramidal chamber 4. At focal point 24, solar light rays 18 intersect and are contacted by steam S, which is released into top portion 3 of the oblique pyramidal chamber 4 by means of regulator 20. As solar light rays 18 and steam S come into contact with each other at top portion 3, steam S ignites producing energy in the form of heat H. The amount of heat H generated by the ignition of steam S may be controlled by the number of mirrors (not shown) placed on heliostat mirror matrix 2 or the amount of steam S allowed into top portion 3 by regulator 20.

Once steam S is ignited, energy in the form of heat H is produced, in addition to the heat being produced within chamber 4 by way of the reflection of rays 18 into, and onto the inner surfaces of, top portion 3. Pyramidal chamber 4 is closed at top portion 3. Thus, as heat H is produced, it accumulates in chamber 4 and is naturally forced downward away from top portion 3. As heat H flows downward, sidewalls 3A come into contact with heat H. Energy in the form of heat H is transferred to sidewalls 3A. Sidewalls 3A increase in temperature and cause a transfer of energy in the form of heat H to water W. Water W is heated to temperatures of at least boiling temperature in this manner. Steam S is produced from the boiling of water W and is released via steam relief line 8 as needed.

Release chamber 5 is in fluid communication with oblique pyramidal chamber 4 at one end portion 25 and forms an aperture 26 at a second end portion 27. Aperture 26 connects release chamber 5 to the surrounding atmosphere. As such, the pressure in pyramidal chamber 4 is greater than the pressure in relief chamber 5 when steam S is ignited in pyramidal chamber 4. Thus, when heat H is forced downward in oblique pyramidal chamber 4, the pressure differential between oblique pyramidal chamber 4 and release chamber 5 creates a vacuum-like condition, effectively pulling heat H from pyramidal chamber 4 and flowing into release chamber 5 and through aperture 26. A drain 12 is operatively connected to release chamber 5 and allows for the removal of water W that may collect on a bottom surface 28 of release chamber 5.

As described above, the mirrors (not shown) of the heliostat mirror matrix 2 are used to direct solar light rays 18 to focal point 24 in top portion 3. The number of mirrors (not shown) may vary and may depend on temperature desired in pyramidal chamber 4. Top portion 3 may be constructed from steel and temperatures in top portion 3 may become significant, e.g., reaching or exceeding 2800° F. A characteristic of steel is loss of structural integrity at temperatures in excess of 2800° F. However, a feature of this embodiment is the ability of steam S in oblique pyramidal chamber 4 to cool the steel of top portion 3 to temperatures below 2800° F. This allows for the use of steel in the embodiment at temperatures usually unacceptable for steel.

Stationary concrete panels 15 are constructed of concrete and support stationary water housing 17. A plurality of stationary steel beams 14 further support housing 17. Although stationary concrete panels 15 are constructed of concrete in this embodiment, it should be appreciated that other like materials of similar structural strength may be used in the alternative without deviating from the scope and spirit of the invention. Likewise, similar materials with similar structural characteristics may be used in place of steel for the stationary steel beams 14 steel side beams 16 in the current embodiment. Sidewalls 3A of oblique pyramidal chamber 4 in the embodiment are made of firebrick or tile. However, other like materials capable of withstanding temperatures in excess of 2800° F. and are capable of transmitting energy in the form of heat may also be used without deviating from the scope and spirit of the invention.

As will be appreciated, steam S provided in steam pipe 6 may be delivered from an external source, e.g. a boiler (not shown) or may be provided from steam S generated by the heating of water W in the present invention. The steam feed pressure may vary, but typically will be greater than the pressure of the atmosphere inside the reflecting chamber. The steam will also typically be under temperature and pressure conditions to be in the form of superheated steam. Water W is provided by an external source of distilled water but may be provided by alternate external sources, e.g. river, without deviating from the spirit of the invention and is provided to housing 17 by flow through water feed line 7. Production of steam S generated by the boiling of water W may be controlled if excessive pressures are formed in housing 17 by means of emergency relief valve line 10.

The geometries of the reflection chamber and the release chamber may vary from that which illustrated herein, as long as the function of the chambers is not significantly impaired by such variations. However, without being bound by theory, it is believed that the oblique pyramidal shape of the reflection chamber optimizes the concentration of solar rays reflected by the reflecting means of this invention.

It also should now be appreciated that the present invention includes a method of generating steam. The method is carried out by providing water to a water chamber formed by a substantially stationary boiler housing; reflecting sunlight onto a focal point in a top portion of a reflection chamber, the reflection chamber being defined by at least a portion of the boiler housing and being in thermal communication with the water chamber, the reflection chamber defining the top portion and a bottom opening vertically disposed below the top portion so as to at least partially trap heat in the reflection chamber when sunlight is reflected onto the focal point to thereby transfer heat into the water chamber to generate steam therein; injecting a portion of the steam formed in the water chamber into the top portion of the reflection chamber while sunlight is reflected onto the focal point; and controllably releasing steam from the water chamber.

The present invention also includes a method of generating electricity, involving the step of carrying out the method of steam generation described herein, and feeding the steam controllably released from the water chamber into at least one steam-driven turbine, to thereby generate electricity. The typical turbine employed will be one or more conventional steam-powered turbines.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law. As used in this specification, means-plus-function clauses, if any, are intended to cover the structures described herein as performing the cited function and not only structural equivalents but also equivalent structures.

The invention claimed is:

1. A boiler for generating steam, the boiler comprising
a substantially enclosed housing configured to contain an amount of water to be boiled, the housing comprising one or more thermally conductive sidewalls which form a substantially enclosed water chamber and a reflection chamber, the reflection chamber including a closed top portion and a opening through which light rays may pass, the opening being vertically disposed below the top portion of the chamber so that the reflection chamber may trap heat, wherein at least one of the thermally conductive sidewalls is disposed so as to divide the water chamber from the reflection chamber,
a support structure attached to or integral with the housing, which support structure supports the housing in a substantially fixed position during use of the boiler,
reflecting means for reflecting sunlight through the opening of the reflection chamber and onto a focal point on one or more inner surfaces of the top portion of the reflection chamber, and a feed conduit sized and configured for controlled feeding of steam under pressure through at least one of the sidewalls and into the top portion of the reflection chamber.

2. The boiler of claim 1, wherein the steam is superheated steam formed within the water chamber during boiler operation.

3. The boiler of claim 1, further comprising a control valve which terminates the steam feed through the feed conduit when sunlight is not being reflected into the reflection chamber.

4. The boiler of claim 1, wherein the reflecting means comprises a tracking heliostat.

5. The boiler of claim 1, wherein one or more of the thermally conductive sidewalls of the housing further define, at least in part, a release chamber through which heated gas and/or steam from the reflection chamber may flow before being released into the atmosphere, at least one of the thermally conductive sidewalls of the housing which defines the release chamber placing the release chamber in thermal communication with the water chamber so that at least a portion of the heat in the release chamber generated during boiler operation is absorbed by water when water is present in the water chamber.

6. The boiler of claim 1, wherein the opening of the reflection chamber is sized and configured so that reflected sunrays from the reflecting means pass through the opening and are incident upon the focal point during daylight hours.

7. The boiler of claim 1 further comprising a feed conduit sized and configured for controlled feeding of steam under pressure through at least one of the sidewalls and into the top portion of the reflection chamber; further comprising a control valve which terminates the steam feed through the feed conduit when sunlight is not being reflected into the reflection chamber;

wherein the steam is superheated steam formed within the water chamber during boiler operation;

wherein the reflecting means comprises a tracking heliostat;

wherein one or more of the thermally conductive sidewalls of the housing further define, at least in part, a release chamber through which heated gas and/or steam from the reflection chamber may flow before being released into the atmosphere, at least one of the thermally conductive sidewalls of the housing which defines the release chamber placing the release chamber in thermal communication with the water chamber so that at least a portion of the heat in the release chamber generated during boiler operation is absorbed by water when water is present in the water chamber; and wherein the opening of the reflection chamber is sized and configured so that reflected sunlight from the reflecting means passes through the opening and is incident upon the focal point during daylight hours.

8. A method of generating steam, comprising
providing water to a water chamber formed by a substantially stationary boiler housing,
reflecting sunlight onto a focal point in a top portion of a reflection chamber, the reflection chamber being defined by at least a portion of the boiler housing and being in thermal communication with the water chamber, the reflection chamber defining the top portion and a bottom opening vertically disposed below the top portion so as to at least partially trap heat in the reflection chamber when sunlight is reflected onto the focal point to thereby transfer heat into the water chamber to generate steam therein, and injecting a portion of the steam formed in the water chamber into the top portion of the reflection chamber while sunlight is reflected onto the focal point, and controllably releasing steam from the water chamber.

9. A method of generating electricity, the method comprising carrying out the method of claim 8, feeding the steam controllably released from the water chamber into a steam turbine to thereby generate electricity.

* * * * *